US012455524B2

(12) United States Patent
Maeda et al.

(10) Patent No.: US 12,455,524 B2
(45) Date of Patent: Oct. 28, 2025

(54) FIXING ROTATING MEMBER, FIXING APPARATUS, AND ELECTROPHOTOGRAPHIC IMAGE FORMING APPARATUS

(71) Applicant: CANON KABUSHIKI KAISHA, Tokyo (JP)

(72) Inventors: Matsutaka Maeda, Kanagawa (JP); Takaaki Tsuruya, Shizuoka (JP); Akira Okano, Kanagawa (JP); Makoto Souma, Kanagawa (JP); Naoko Kasai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/490,933

(22) Filed: Oct. 20, 2023

(65) Prior Publication Data

US 2024/0160135 A1 May 16, 2024

(30) Foreign Application Priority Data

Oct. 26, 2022 (JP) ................................. 2022-171564
Oct. 10, 2023 (JP) ................................. 2023-175062

(51) Int. Cl.
*G03G 15/20* (2006.01)

(52) U.S. Cl.
CPC ................................ *G03G 15/2057* (2013.01)

(58) Field of Classification Search
CPC .................................................. G03G 15/2057
See application file for complete search history.

(56) References Cited

U.S. PATENT DOCUMENTS 6,223,017 B1 * 4/2001 Akutsu ................ H05B 3/0095 399/335
8,019,266 B2 9/2011 Baba et al.
8,483,603 B2 7/2013 Nihonyanagi et al.
8,550,877 B2 10/2013 Hiroshi et al.
(Continued)

FOREIGN PATENT DOCUMENTS

EP 3 835 060 A1 6/2021
JP 10-165311 A 6/1998
(Continued)

OTHER PUBLICATIONS

Nobuyuki Otsu, "A Threshold Selection Method from Gray-Level Histograms," SMC-9(1) IEEE Trans. Syst. Man Cybern. 62-66 (Jan. 1979).
(Continued)

*Primary Examiner* — Stephanie E Bloss
*Assistant Examiner* — Michael A Harrison
(74) *Attorney, Agent, or Firm* — Venable LLP

(57) ABSTRACT

A fixing rotating member comprising: a substrate comprising a resin; an electro-conductive layer on the substrate; and a resinous layer on a surface of the electro-conductive layer, the surface being opposed to a side of the electro-conductive layer facing the substrate, the electro-conductive layer extending in a circumferential direction of an outer peripheral surface of the substrate, the electro-conductive layer comprising silver, the electro-conductive layer having, in a thickness direction thereof, a through-hole, wherein at least a part of the through-hole is penetrated by a resin that constitutes at least a part of the resinous layer.

7 Claims, 4 Drawing Sheets

(56) References Cited

U.S. PATENT DOCUMENTS

| | | | |
|---|---|---|---|
| 10,012,935 B2 | 7/2018 | Nishizawa et al. | |
| 10,216,130 B2 | 2/2019 | Imaizumi et al. | |
| 10,452,012 B2 | 10/2019 | Usui et al. | |
| 10,503,105 B2 | 12/2019 | Imaizumi et al. | |
| 10,802,433 B1 | 10/2020 | Watanabe et al. | |
| 11,644,777 B2 | 5/2023 | Ishifuji et al. | |
| 12,313,993 B2 | 5/2025 | Okano et al. | |
| 2006/0204295 A1* | 9/2006 | Takagi | G03G 15/2057 399/333 |
| 2008/0124111 A1 | 5/2008 | Baba et al. | |
| 2011/0150545 A1 | 6/2011 | Nihonyanagi et al. | |
| 2017/0160682 A1* | 6/2017 | Nishizawa | G03G 15/2053 |
| 2018/0173140 A1 | 6/2018 | Imaizumi et al. | |
| 2019/0033758 A1* | 1/2019 | Uehashi | G03G 15/206 |
| 2019/0171145 A1 | 6/2019 | Imaizumi et al. | |
| 2024/0160136 A1 | 5/2024 | Okano et al. | |
| 2024/0168420 A1 | 5/2024 | Souma et al. | |

FOREIGN PATENT DOCUMENTS

| | | |
|---|---|---|
| JP | 2005-202272 A | 7/2005 |
| JP | 2006-10884 A | 1/2006 |
| JP | 2008-152247 A | 7/2008 |
| JP | 2012-68513 A | 4/2012 |
| JP | 2013-228708 A | 11/2013 |
| JP | 2018-133157 A | 8/2018 |
| JP | 2020-105551 A | 7/2020 |
| JP | 2021-51136 A | 4/2021 |
| WO | 2016/208153 A1 | 12/2016 |

OTHER PUBLICATIONS

Souma et al., U.S. Appl. No. 18/490,924, filed Oct. 20, 2023.
Okano et al., U.S. Appl. No. 18/490,973, filed Oct. 20, 2023.
JP 2008-152247, U.S. Pat. No. 8,019,266 B2.
JP 2012-68513, U.S. Pat. No. 8,550,877 B2.
JP 2018-133157, U.S. Pat. No. 10,452,012 B2.
JP 2021-51136, U.S. Pat. No. 10,802,433 B2.
Extended European Search Report in European Application No. 23205805.7 (Mar. 2024).
Non-final Office Action in U.S. Appl. No. 18/490,973 (Sep. 2024).
Notice of Allowance in U.S. Appl. No. 18/490,924 (Aug. 2025).

* cited by examiner

FIXING ROTATING MEMBER, FIXING APPARATUS, AND ELECTROPHOTOGRAPHIC IMAGE FORMING APPARATUS

BACKGROUND

Technical Field

The present disclosure relates to a fixing rotating member that is used in a fixing apparatus of an electrophotographic image forming apparatus, such as an electrophotographic copier or printer, and relates to a fixing apparatus, and to an electrophotographic image forming apparatus.

Description of the Related Art

In a fixing apparatus installed in an electrophotographic image forming apparatus such as an electrophotographic copier or printer, generally a recording material carrying an unfixed toner image is heated, while being transported, at a nip portion formed between a fixing rotating member that is heated and a pressure roller that is in contact with the fixing rotating member, whereupon a toner image becomes fixed, as a result, onto the recording material.

A fixing apparatus relying on electromagnetic-induction heat generation schemes and having an electro-conductive layer on a fixing rotating member, such that the electro-conductive layer can be directly caused to generate heat, has been developed and put into practical use. The fixing apparatus of electromagnetic-induction heat generation type is advantageous in that it affords short warm-up times.

As a fixing member used in such a fixing apparatus, Japanese Patent Application Publication No. 2021-051136 discloses a fixing member that has: a substrate layer containing a resin; an electromagnetic induction metal layer that contains copper and that is provided on the outer peripheral surface of the substrate layer; a metal protective layer containing nickel and that is provided in contact with the electromagnetic induction metal layer; and an elastic layer provided on the outer peripheral surface of the metal protective layer.

SUMMARY

At least one aspect of the present disclosure is directed to providing a fixing rotating member that is excellent in durability, and that comprises an electro-conductive layer comprising silver, with the electro-conductive layer exhibiting high adhesiveness to a substrate. Also, at least one aspect of the present disclosure is directed to providing a fixing apparatus that contributes to providing stably high-quality electrophotographic images. Further, at least one aspect of the present disclosure is directed to providing an electrophotographic image forming apparatus capable of forming stably high-quality electrophotographic images.

According to at least one aspect of the present disclosure, there is provided a fixing rotating member comprising: a substrate comprising a resin; an electro-conductive layer on the substrate; and a resinous layer on a surface of the electro-conductive layer, the surface being opposed to a side of the electro-conductive layer facing the substrate, the electro-conductive layer extending in a circumferential direction of an outer peripheral surface of the substrate, the electro-conductive layer comprising silver, the electro-conductive layer having, in a thickness direction thereof, a through-hole, wherein at least a part of the through-hole is penetrated by a resin that constitutes at least a part of the resinous layer.

Further, according to at least one aspect of the present disclosure, there is provided a fixing apparatus comprising the above fixing rotating member, and an induction heating device causing the fixing rotating member to generate heat by induction heating.

Furthermore, according to at least one aspect of the present disclosure, there is provided an electrophotographic image forming apparatus, wherein the electrophotographic image forming apparatus comprises
- an image bearing member bearing a toner image;
- a transfer device transferring the toner image to a recording material; and
- a fixing apparatus fixing the transferred toner image to the recording material, the fixing apparatus is the above fixing apparatus.

Further features of the present disclosure will become apparent from the following description of exemplary embodiments with reference to the attached drawings.

DESCRIPTION OF THE EMBODIMENTS

In the present disclosure the notations "from XX to YY" and "XX to YY" representing a numerical value range signify, unless otherwise specified, a numerical value range that includes the lower limit and the upper limit of the range, as endpoints. In a case where numerical value ranges are described in stages, the upper limits and the lower limits of the respective numerical value ranges can be combined arbitrarily. In the present disclosure, for instance, a wording such as "at least one selected from the group consisting of XX, YY and ZZ" encompasses XX, YY and ZZ, a combination of XX and YY, a combination of XX and ZZ, a combination of YY and ZZ, and a combination of XX, YY and ZZ.

Further improvements in the durability of an electro-conductive layer are being demanded in the wake of the higher speed of printers in recent years. In a case where an electromagnetic induction layer contains copper, the electromagnetic induction layer must be protected against oxidation of copper, since copper becomes readily oxidized, by covering the electromagnetic induction layer with a layer of a metal such as nickel, for instance as disclosed in Japanese Patent Application Publication No. 2021-051136.

The inventors have therefore addressed the use of silver, which is comparatively resistant to oxidation and exhibits high conductivity, as a constituent material of an electromagnetic induction layer. In the process, the inventors have found that when an electromagnetic induction layer (heat generating layer) made up of silver is formed on a substrate by silver plating, adhesion of the silver plating to the substrate is not necessarily sufficient, and that there is still room for improvement in terms of further improving the durability of a fixing member.

A fixing rotating member is repeatedly strained at a nip portion, under heating, and thus the fixing rotating member is required to exhibit long-term durability. Delamination between layers is herein one failure mode that affects durability. Specifically, delamination between the substrate made up of a resin and the electro-conductive layer, made up of silver, and between the electro-conductive layer and a resinous layer formed on the electro-conductive layer, occurs on account of differences in the stress that acts upon the substrate, the electro-conductive layer, and the resinous layer. When such a defect occurs, cracks or the like develop in the electro-conductive layer, starting from that defect, and conductivity is impaired.

Figure 1:
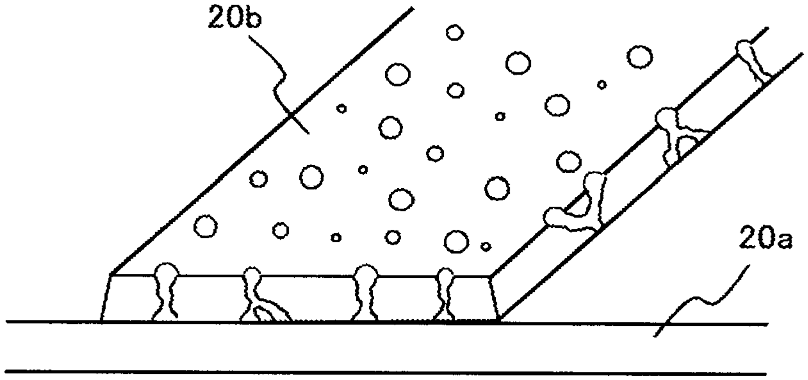
FIG. 1 is a schematic diagram illustrating the form of an electro-conductive layer.

Studies by the inventors have revealed that by providing pores running through the electro-conductive layer in the thickness direction, such that a resin which is a protective layer penetrates into the through-holes, as illustrated in FIG. 1, the substrate, the electro-conductive layer and the resinous layer become integrated with each other and bonded firmly to each other as a result, thanks to which the occurrence of delamination is suppressed and durability is improved.

A detailed explanation follows next, on the basis of the concrete configurations below, on a fixing rotating member having an electro-conductive layer, and on a fixing apparatus and on an electrophotographic image forming apparatus that are configured using the fixing rotating member.

However, the dimensions, materials, shapes, relative arrangement and so forth of the constituent parts described in the present aspects are to be modified as appropriate in accordance with the configuration of the members to which the disclosure is to be applied, and depending on various conditions. That is, the scope of the present disclosure is not meant to be limited to the aspects below. In the explanation that follows, features that elicit a same function are denoted by the same reference symbols in the drawings, and an explanation thereof may be omitted.

Electrophotographic Image Forming Apparatus

An electrophotographic image forming apparatus (hereafter also simply referred to as an "image forming apparatus") comprises an image bearing member bearing a toner image, a transfer device transferring the toner image onto a recording material, and a fixing apparatus fixing the transferred toner image to the recording material.

Figure 2:
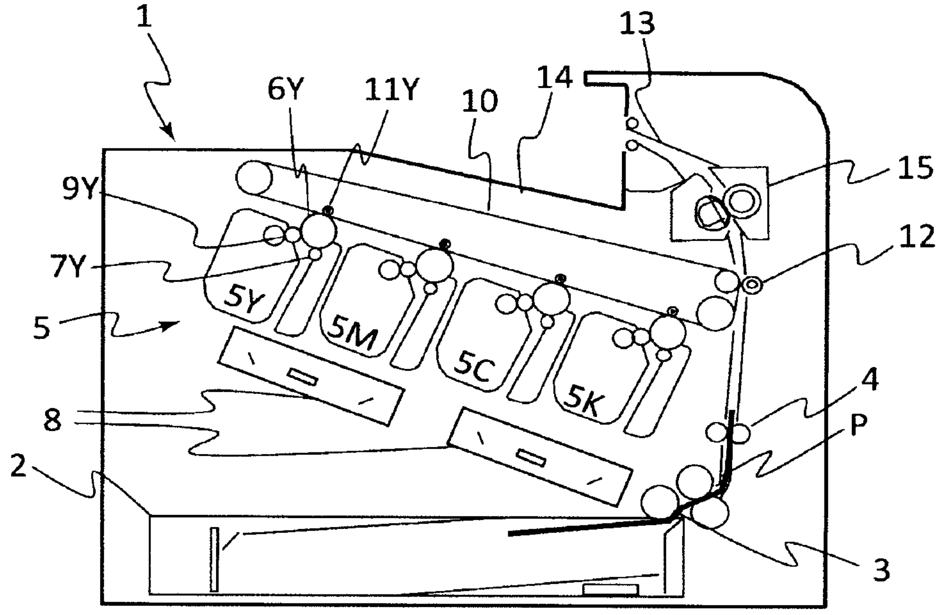
FIG. 2 is a schematic diagram of an electrophotographic image forming apparatus according to an embodiment.

FIG. 2 is a cross-sectional diagram illustrating the overall configuration of a color laser beam printer (hereafter, printer) 1 as an example of an image forming apparatus in which there is installed a fixing apparatus (image heating device) 15 according to an embodiment. A cassette 2 is accommodated, so that it can be pulled out, at in the bottom part of the printer 1. Sheets P as a recording material are piled up and accommodated in the cassette 2. The sheets P in the cassette 2 are fed to registration rollers 4 while being separated, one by one, by separation rollers 3.

Various sheets of different sizes and materials, for instance paper such as plain paper and heavy paper, plastic films, cloth, surface-treated sheet materials such as coated paper, and special-shaped sheet materials such as envelopes and index paper, can be used as the sheets P which are a recording material.

The printer 1 includes an image forming unit 5 as an image forming means in which image forming stations 5Y, 5M, 5C, 5K corresponding to respective colors of yellow, magenta, cyan and black are juxtaposed in a horizontal row. The image forming station 5Y is provided with a photosensitive drum 6Y, which is an image bearing member (electrophotographic photosensitive member) for carrying a toner image, and with a charging roller 7Y as charging means for uniformly charging the surface of the photosensitive drum 6Y.

Scanner units 8 are disposed below the image forming unit 5. A respective scanner unit 8 forms an electrostatic latent image on the photosensitive drum 6Y, by projecting thereonto a laser beam that is on-off-modulated in accordance with a digital image signal, generated by an image processing means and having been inputted from an external device such as a computer, not shown, on the basis of image information. The image forming station 5Y further has a developing roller 9Y as a developing means for developing, in the form of a toner image (toner image), the toner adhered to the electrostatic latent image on the photosensitive drum 6Y, and a primary transfer unit 11Y that transfers the toner image on the photosensitive drum 6Y to an intermediate transfer belt 10.

Toner images formed in accordance with a similar process similar, at the other image forming stations 5M, 5C, 5K, are overlappingly transferred onto the toner image on the intermediate transfer belt 10 having had a toner image transferred thereto at the primary transfer unit 11Y. A full-color toner image becomes formed as a result on the intermediate transfer belt 10. This full-color toner image is transferred onto the sheet P at a secondary transfer unit 12 as a transfer means. The primary transfer unit 11Y and the secondary transfer unit 12 are examples of the fixing apparatus that fixes the transferred toner image onto the recording material.

Thereafter, the toner image transferred onto the sheet P (recording material) passes through the fixing apparatus 15, and becomes fixed as a fixed image. The sheet P passes through a discharge transport unit 13 and is discharged and stacked on a stacking unit 14.

The image forming unit 5 is an example of an image forming means. Although the primary transfer unit 11Y and the secondary transfer unit 12 are illustrated herein as an example of the fixing apparatus, the fixing apparatus may be for instance a fixing apparatus of direct transfer type in which the toner image is transferred directly from the image bearing member to the sheet P. Also, the image forming apparatus may have a monochrome configuration in which toner of only one color is used.

Fixing Apparatus

Figure 3:
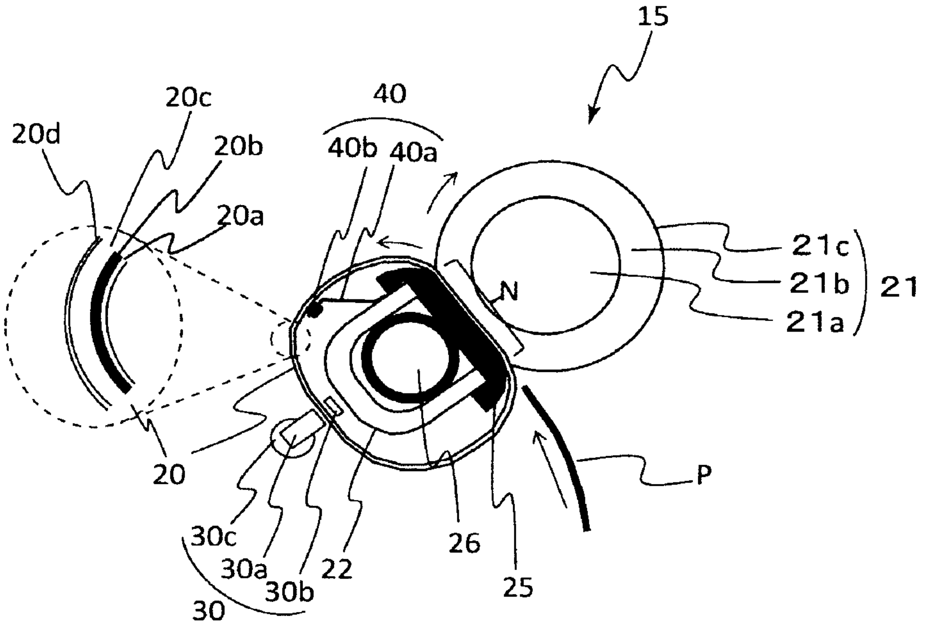
FIG. 3 is a schematic diagram illustrating a cross-sectional configuration of a fixing apparatus according to an embodiment.
Figure 4:
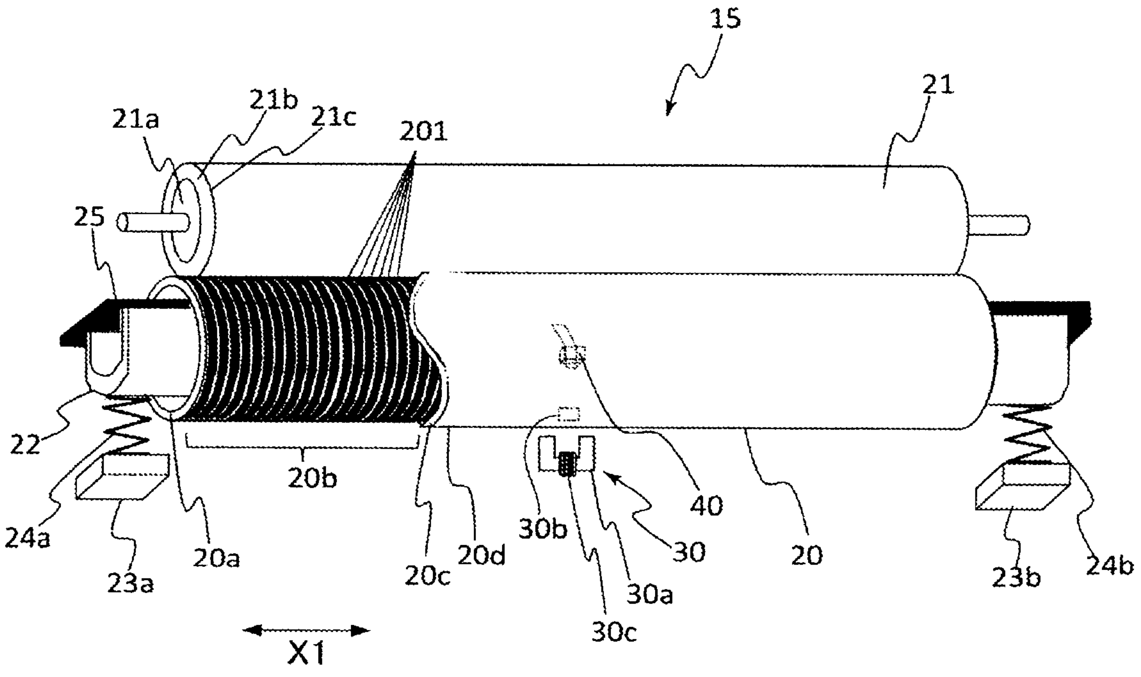
FIG. 4 is a schematic diagram illustrating a cross-sectional configuration of a fixing apparatus according to an embodiment.

The fixing apparatus 15 of the present embodiment is a fixing apparatus (image heating device) of induction heating type that causes a fixing rotating member to generate heat by electromagnetic induction. FIG. 3 illustrates the cross-sectional configuration of the fixing apparatus 15, and FIG. 4 is a perspective-view diagram of the fixing apparatus 15. The housing and so forth of the fixing apparatus 15 are omitted in FIG. 3 and FIG. 4. In the explanation that follows, a longitudinal direction X1 as pertaining to members that make up the fixing apparatus 15 denotes a direction perpendicular to the transport direction of the recording material and to the thickness direction of the recording material.

The fixing apparatus 15 includes a fixing rotating member 20, a film guide 25, a pressure roller 21, a pressure stay 22, a magnetic core 26, an excitation coil 27 (FIG. 5), a thermistor 40 and a current sensor 30. The fixing apparatus 15 heats up the recording material on which the image is formed, to fix the image on the recording material. The fixing rotating member 20 is a rotating member of the present embodiment, and the pressure roller 21 is an opposing member of the present embodiment. The excitation coil 27 functions as a magnetic field generating means of the present embodiment. Details of the fixing rotating member will be described further on.

The fixing rotating member 20 comprises an electro-conductive layer 20*b* as a heat generating layer, on a substrate. The electro-conductive layer 20*b* can generate heat for instance by induced current. The electro-conductive layer (heat generating layer) 20*b* is formed as respective rings electrically connected in the circumferential direction, such that a heat generation pattern is formed in which heat generating rings 201 (FIG. 4), electrically divided from each other in the longitudinal direction X1 (rotation axis direction of the fixing rotating member 20), are juxtaposed side by side in the longitudinal direction.

That is, the electro-conductive layer 20*b* is divided into a plurality of annular regions that are each connected in the circumferential direction of the fixing rotating member 20, but which do not conduct with each other in the rotation axis direction of the fixing rotating member 20. Each heat generating ring 201, which is a constituent element of the heat generation pattern, is formed to be uniformly wide in the longitudinal direction X1.

A pressure roller 21 as a facing member (pressing member) that faces the fixing rotating member 20 has a metal core 21*a*, an elastic layer 21*b* that is concentrically and integrally molded around the metal core, to a roller shape covering the metal core, and a release layer 21*c* provided at a surface layer. The elastic layer 21*b* is preferably made up of a material having good heat resistance, such as silicone rubber, a fluororubber, or fluorosilicone rubber. Both ends of the metal core 21*a* in the longitudinal direction are rotatably held between metal plates, not shown, on the chassis side of the apparatus, across conductive bearings.

As illustrated in FIG. 4, pressure springs 24*a*, 24*b* are compressed between respective ends of the pressure stay 22 in the longitudinal direction, and respective spring receiving members 23*a*, 23*b* on the device chassis side, as a result of which a push-down force is exerted on the pressure stay 22.

In the fixing apparatus 15 of the present embodiment there is applied a total pressure of about 100 N to 300 N (about 10 kgf to about 30 kgf). As a result, the lower surface of the film guide 25 made up of a heat-resistant resin PPS or the like and the top surface of the pressure roller 21 are pressed against each other, across the interposed fixing rotating member 20 being a cylindrical rotating member, to thereby form a fixing nip portion N having a predetermined width.

The film guide 25 functions as a nip portion forming member that forms, together the pressure roller 21 and across the fixing rotating member 20 in between, a nip portion at which the recording material bearing a toner image is nipped and transported.

Herein PPS is polyphenylene sulfide.

The pressure roller 21 is rotationally driven clockwise by a driving means, not shown, such that a counterclockwise rotational force acts on the fixing rotating member 20 on account of frictional forces with the outer surface of the fixing rotating member 20. The fixing rotating member 20 rotates as a result while sliding on the film guide 25.

Figure 5:
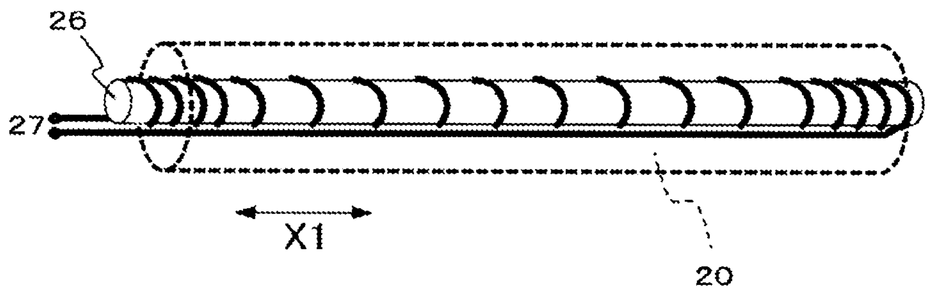
FIG. 5 is a schematic diagram of a magnetic core and an excitation coil of a fixing apparatus according to an embodiment.

FIG. 5 is a schematic diagram of the magnetic core 26 and the excitation coil 27 of FIG. 3, in which the fixing rotating member 20 is denoted by a dashed line, for the purpose of explaining a positional relationship relative to the fixing rotating member 20. An induction heating device in a fixing apparatus of induction heating type that causes the fixing rotating member 20 to generate heat by electromagnetic induction may include the magnetic core 26 and the excitation coil 27.

The excitation coil 27 is disposed in the interior of the fixing rotating member 20. The excitation coil 27, which has a spiral shape portion the spiral axis whereof is substantially parallel to the direction of the rotation axis of the fixing rotating member 20, forms an alternating magnetic field that causes the electro-conductive layer 20*b* to generate heat by electromagnetic induction. The language "substantially parallel" denotes herein not only a state in which two axes are perfectly parallel to each other, but signifies also that slight deviations from that state are permissible, so long as the electro-conductive layer can generate heat by electromagnetic induction.

The magnetic core 26 is disposed, within the spiral shape portion, while extending in the rotation axis direction of the fixing rotating member 20 so as not to form a loop outward of the fixing rotating member 20. The magnetic core 26 induces magnetic force lines of the alternating magnetic field.

In FIG. 5 the magnetic core 26 is inserted through a hollow portion of the fixing rotating member 20, which is a tubular rotating member. The excitation coil 27 is spirally wound around the outer periphery of the magnetic core 26, while extending in the longitudinal direction of the fixing rotating member 20. The magnetic core 26 has a columnar shape, and is fixed by a fixing means, not shown, so as to be positioned substantially at the center of the fixing rotating member 20 in a cross section viewed from the longitudinal direction (see FIG. 3).

The magnetic core 26 provided inside the excitation coil 27 has the role of guiding the magnetic force lines (magnetic flux) of the alternating magnetic field, generated by the excitation coil 27, to the inward side of the electro-conductive layer 20*b* of the fixing rotating member 20, forming a path (magnetic path) of the magnetic force lines. The material of the magnetic core 26, which is a ferromagnetic body, is preferably a material having small hysteresis loss and high relative magnetic permeability, the material being for instance at least one soft magnetic body of high magnetic permeability selected from the group consisting of for instance fired ferrite and ferrite resins.

Preferably, the magnetic core 26 is shaped so that 70% or more of the magnetic flux radiated from one longitudinal end of the magnetic core 26 in the rotation axis direction passes by the outer side of the electro-conductive layer 20*b*, and returns to the other longitudinal end of the magnetic core 26.

The cross-sectional shape of the magnetic core 26 may be any shape so long as the magnetic core 26 can be accommodated in the hollow portion of the fixing rotating member 20; the cross-sectional shape of the magnetic core 26 need not necessarily be circular, but is preferably a shape that translates into the largest possible cross-sectional area. The magnetic core 26 in the present embodiment had a diameter of 10 mm and a longitudinal length of 280 mm.

The excitation coil 27 was formed as a result of spirally winding a copper wire (single conductor wire) having a diameter of 1 to 2 mm and coated with heat-resistant polyamide-imide, over 20 turns around the magnetic core 26. The excitation coil 27 is wound around the magnetic core 26 in a direction that intersects the rotation axis direction of the fixing rotating member 20. Therefore, when a high-frequency alternating current pass through the excitation coil 27, an alternating magnetic field becomes generated in a direction parallel to the rotation axis direction, such that an induced current (circulating current) flows, according to the below-described principle, in heat generating rings 201 of the electro-conductive layer 20*b* of the fixing rotating member 20, and heat is generated as a result.

As illustrated in FIG. 3 and FIG. 4, the thermistor 40 as a temperature detection means for detecting the temperature of the fixing rotating member 20 is made up of a spring plate 40*a* and a thermistor element 40*b*. The spring plate 40*a* is a support member having spring elasticity and extending toward the inner surface of the fixing rotating member 20. The thermistor element 40*b* as a temperature detection element is installed at the tip of the spring plate 40*a*. The surface of the thermistor element 40*b* is covered with 50 μm-thick polyimide tape, to ensure electrical insulation.

The thermistor 40 is installed by being fixed to the film guide 25 at a substantially central position of the fixing rotating member 20 in the longitudinal direction. The thermistor element 40*b* is pressed against the inner surface of the fixing rotating member 20, and is held in contact thereto, by virtue of the spring elasticity of the spring plate 40*a*. The thermistor 40 may be disposed on the outer peripheral side of the fixing rotating member 20.

The current sensor 30 that makes up a conduction monitoring device for monitoring conduction in the circumferential direction of the electro-conductive layer 20*b* is disposed at the same position as that of the thermistor 40, in the longitudinal direction of the fixing apparatus 15. That is, the current sensor 30 monitors the conduction state of the heat generating rings 201 at the position where the thermistor element 40*b* is in contact therewith, from among the plurality of heat generating rings 201 that make up the heat generation pattern of the fixing rotating member 20.

Heat Generation Principle

Figure 6:
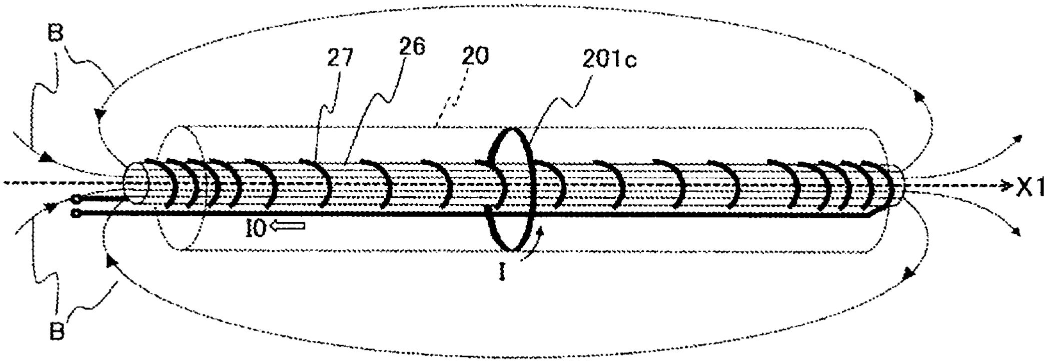
FIG. 6 is a diagram illustrating a magnetic field formed when current is caused to flow through an excitation coil according to an embodiment.

An explanation follows next on the heat generation principle of the fixing rotating member 20 in the induction heating-type fixing apparatus 15. FIG. 6 is a conceptual diagram illustrating an instant at which the current in the excitation coil 27 is increasing in the direction of arrow I0. The excitation coil 27, inserted in the fixing rotating member 20, generates an alternating magnetic field in the rotation axis direction of the fixing rotating member 20 as a result of flow of an alternating current through the excitation coil 27, which functions thus as a magnetic field generating means for generating an induced current I in the circumferential direction of the fixing rotating member 20.

The magnetic core 26 functions as a member that forms a magnetic path by guiding magnetic force lines B (dotted lines in the figure) generated by the excitation coil 27. In general induction heating methods, magnetic force lines pass through an electro-conductive layer giving rise to eddy currents; in the present embodiment, by contrast, the magnetic force lines B loop outward of the fixing rotating member. That is, the electro-conductive layer 20*b* mainly generates heat on account of the induced current that is induced by the magnetic force lines that exit from one longitudinal end of the magnetic core 26, pass by the outer side of the electro-conductive layer 20*b*, and return to the other longitudinal end of the magnetic core 26. As a result, heat can be efficiently generated even when the thickness of the electro-conductive layer is small, for instance of 4 μm or less.

Upon formation of an alternating magnetic field by the excitation coil 27, an induced current I according to Faraday's law flows through the heat generating rings 201 of the electro-conductive layer 20*b* of the fixing rotating member 20. Faraday's law states that "when a magnetic field in a circuit is caused to vary, an induced electromotive force becomes generated thereupon that causes a current to flow in the circuit, the induced electromotive force being proportional to the change over time of magnetic flux that runs perpendicularly through the circuit".

Regarding a heat generating ring 201*c* positioned in the central portion, in the longitudinal direction, of the magnetic core 26 illustrated in FIG. 6, it is deemed that an induced current I flows in the heat generating ring 201*c* in a case where a high-frequency alternating current is caused to flow through the excitation coil 27. An alternating magnetic field is formed inside the magnetic core 26 when this high-frequency alternating current is caused to flow. The induced electromotive force acting on the heat generating ring 201*c* is herein proportional to the change over time of the magnetic flux running perpendicularly through the inward side of the heat generating ring 201*c*, in accordance with Expression below.

$$V = -N\frac{\Delta\Phi}{\Delta t}$$

V: induced electromotive force

N: Number of coil turns

ΔΦ/Δt: change in magnetic flux running perpendicularly through the circuit (heat generating ring 201*c*) in a small time increment Δt This induced electromotive force V elicits flow of an induced current I, which is a circulating current going around the heat generating ring 201*c*; the heat generating ring 201*c* generates heat thereupon, derived from Joule heat arising from the induced current I.

In a case however where the heat generating ring 201*c* is broken off, the induced current I no longer flows, and the heat generating ring 201*c* does not generate heat.

(1) Schematic Configuration of a Fixing Rotating Member

Details about the fixing rotating member of the present embodiment will be explained next with reference to accompanying drawings.

The fixing rotating member according to one aspect of the present disclosure can be for instance a rotatable member such as an endless belt.

Figure 7:
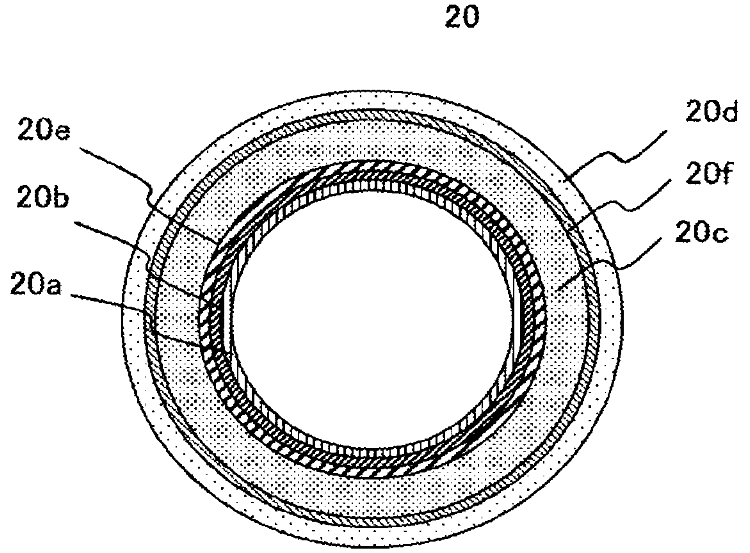
FIG. 7 is a cross-sectional configuration diagram of a fixing rotating member according to an embodiment.

FIG. 7 is a circumferential-direction cross-sectional diagram of the fixing rotating member. As illustrated in FIG. 7, the fixing rotating member comprises a substrate 20*a*, an electro-conductive layer 20*b* on the outer surface of the substrate 20*a*, and a resinous layer 20*e* on the outer surface of the electro-conductive layer. An elastic layer 20*c* and a surface layer (release layer) 20*d* may be provided on the resinous layer 20*e* as needed, and an adhesive layer 20*f* may be provided between the elastic layer 20*c* and a surface layer 20*d*.

(2) Substrate

The material of the substrate 20*a* is not particularly limited, so long as it is a layer containing at least a resin. That is, the substrate 20*a* comprises a resin. When the belt is used in a fixing apparatus of electromagnetic induction type, the substrate 20*a* is preferably a layer that maintains high strength, with little change in physical properties, in a state where the electro-conductive layer is generating heat. Accordingly, the substrate 20*a* preferably comprises a heat-resistant resin as a main component, and preferably, the substrate 20*a* consists of a heat-resistant resin.

The resin comprised in the substrate 20*a* (preferably the resin that constitutes at least a part of the substrate) preferably comprises at least one selected from the group consisting of a polyimide (PI), a polyamide-imide (PAI), a modified polyimide and a modified polyamide-imide. More preferably, the resin comprised in the substrate 20*a* is at least one selected from the group consisting of polyimide and polyamide-imide. A polyimide is particularly preferred among the foregoing. In the present disclosure the term main component denotes the component of highest content from among the components that constitute the object (here, the substrate).

Modification in modified polyimides and modified polyamide-imides includes for instance siloxane modification, carbonate modification, fluorine modification, urethane modification, triazine modification and phenol modification.

A filler may be formulated into in the substrate 20*a*, for the purpose of improving heat insulation and strength.

The shape of the substrate can be selected as appropriate for instance in accordance with the shape of the fixing rotating member, and can adopt various shapes such as an endless belt shape, a hollow cylindrical shape or a film shape.

In the case of a fixing belt, the thickness of the substrate 20*a* is preferably for instance 10 to 100 μm, and more preferably 20 to 60 μm. Setting the thickness of the substrate 20*a* to lie in the above range allows bringing out both strength and flexibility at a high level.

In a case where the inner peripheral face of the fixing belt comes in contact with another member, for instance a layer for preventing wear of the inner peripheral face of the fixing belt and/or a layer for enhancing slidability with another member can be provided on the surface of the substrate 20*a*, on the reverse side from that facing the electro-conductive layer 20*b*.

In order to improve adhesiveness and wettability with the electro-conductive layer 20*b*, the outer peripheral surface of the substrate 20*a* is subjected to a surface roughening treatment such as blasting, and/or a modification treatment for instance with ultraviolet rays or plasma, or to chemical etching.

(3) Electro-Conductive Layer

The electro-conductive layer 20*b* is a layer that generates heat when energized. According to the principle of heat generation by induction heating using an excitation coil, a magnetic field is induced when an alternating current is supplied to an excitation coil that is disposed in the vicinity of the fixing rotating member, and a current arises thereupon in the electro-conductive layer 20*b* of the fixing rotating member on account of the induced magnetic field, such that heat is generated on account of Joule heat.

Silver, which has a low volume resistivity and does not oxidize readily, is preferable as the material of the electro-conductive layer 20*b*. The electro-conductive layer 20*b* contains silver. The electro-conductive layer 20*b* may contain a metal other than silver, so long as the effects of the present disclosure are not impaired thereby. However, the purity of the silver constituting at least a part of the electro-conductive layer 20*b* is preferably 90 mass % or higher, more preferably 99 mass % or higher, and particularly preferably 99.9 mass % or higher. The upper limit of silver content is not particularly restricted, but is, for example, the upper limit is 100 mass % or less.

In the fixing member, the analysis of the materials of the electro-conductive, such as the purity of the silver, can be performed in accordance with the following procedure.

Six samples each having a length of 5 mm, a width of 5 mm and a thickness being the total thickness of the fixing rotating member are taken at arbitrary positions of the fixing rotating member. A circumferential cross section of the fixing rotating member, for each of the obtained six samples, is exposed using a cross section polisher (product name: SM09010, by JEOL Ltd.).

Subsequently, the cross section of each exposed electro-conductive layer is observed using a scanning electron microscope (SEM) (product name: JSM-F100, by JEOL Ltd.), and the silver crystal particles in the observed image are analyzed by energy-dispersive X-ray spectroscopy (EDS). Observation conditions include 20000 magnifications and a secondary electron image acquisition mode, and EDS analysis conditions involving an acceleration voltage of 5.0 kV and a working distance of 10 mm. Area designation is performed for the spatial range of EDS analysis, with adjustments so as to select only silver crystal particles within the observed image.

Herein one image is acquired for one sample, and EDS analysis is performed at three sites within one image. The purity of the silver constituting at least a part of the electro-conductive layer can be determined by analyzing the purity of the silver at a total of 18 sites in the six samples, and by calculating the arithmetic mean value of the result.

The maximum thickness of the electro-conductive layer 20*b* is preferably 4 μm or less. By setting the maximum thickness of the electro-conductive layer to 4 μm or less it becomes possible to sufficiently reduce the heat capacity of the electro-conductive layer, and to shorten the time required for reaching a temperature at which the electro-conductive layer can be fixed by electromagnetic induction. The bending resistance of the fixing rotating member can be further improved by setting the maximum thickness of the electro-conductive layer to 4 μm or less. As illustrated in FIG. 3, the fixing rotating member 20 is rotationally driven while pressed by the film guide 25 and the pressure roller 21. The fixing rotating member 20 is pressed and deformed at the nip portion N, and is acted upon by stress, at each rotation.

By virtue of the fact that the maximum thickness of the electro-conductive layer is set to be 4 μm or less, the electro-conductive layer 20*b* is less likely to suffer fatigue failure, even when the fixing rotating member is acted upon by such repeated bending over long periods of time. That is because the thinner the electro-conductive layer 20*b*, the smaller is the internal stress acting on the electro-conductive layer 20*b* when pressed and deformed so as to conform to the curved surface shape of the film guide 25.

The lower limit of the maximum thickness of the electro-conductive layer 20*b* is not particularly limited, but is preferably 1 μm or larger. Therefore, the maximum thickness of the electro-conductive layer 20*b* is preferably 1 to 4 μm. In particular, the maximum thickness is 1 to 3 μm.

The maximum thickness of the electro-conductive layer in the fixing rotating member can be measured for instance in accordance with the method below.

Six samples each having a length of 5 mm, a width of 5 mm and a thickness being the total thickness of the fixing rotating member are taken at arbitrary positions of the fixing rotating member. The circumferential cross section of the fixing rotating member, for each of the obtained six samples, is exposed using a cross section polisher (product name: SM09010, by JEOL Ltd.).

Subsequently, the cross section of the exposed electro-conductive layer is observed using a scanning electron microscope (SEM) (product name: JSM-F100, by JEOL Ltd.) at an acceleration voltage of 3 kV, a working distance of 2.9 mm, and at 10000 magnifications, to yield an image that is 13 μm wide and 10 μm high. On the electro-conductive layer in the obtained image there were drawn parallel lines, at a site closest to the substrate and at a site closest to the resinous layer on the opposite side; the distance between the drawn lines was taken as the thickness in the image, and the maximum thickness was defined as the arithmetic mean value of the six samples. The parallel lines were drawn with reference to the surface of the substrate on the reverse side from that of the electro-conductive layer, in the observation area.

The electro-conductive layer 20*b* extends in the circumferential direction of the outer peripheral surface of the substrate 20*a*. The electro-conductive layer 20*b* may be configured according to a preferred pattern, so long as the electro-conductive layer 20*b* can generate heat when energized. In particular, a configuration is preferred herein in which multiple electro-conductive layers 20*b* each having a ring shape are formed, in the circumferential direction of the fixing rotating member, as illustrated in FIG. 4, while electrically divided from each other in the rotation axis direction. Local rises in temperature when cracking occurs in the electro-conductive layer 20*b* can be curtailed by adopting such a configuration. The ring shape preferably has a substantially constant width in the axial direction of the rotating member.

The surface area of the electro-conductive layer 20*b* increases in a case where the electro-conductive layer is configured according to a pattern as described above. The electro-conductive layer is oxidized more readily when formed out of copper. In a case by contrast where silver is used as the material of the electro-conductive layer, it becomes possible to prevent the electro-conductive layer from being oxidized on account of the increase in the surface area derived from patterning of the electro-conductive layer, as described above.

The width of the rings of the electro-conductive layer 20*b* is preferably 100 μm or larger, and more preferably 200 μm or larger, from the viewpoint of manufacturability and heat generation. The width of the rings of the electro-conductive layer 20*b* is preferably 500 μm or smaller, and more preferably 400 μm or smaller, in terms of heat generation unevenness and safety. The width of the rings is for instance 100 to 500 μm, or 200 to 400 μm.

The ring-to ring spacing of the electro-conductive layer 20*b* is preferably 50 μm or larger, and more preferably 100 μm or larger, from the viewpoint of manufacturability and heat generation. In terms of heat generation unevenness, the ring-to ring spacing in the electro-conductive layer 20*b* is preferably 400 μm or smaller, and more preferably 300 μm or smaller. The ring-to ring spacing is for instance 50 to 300 μm, or 100 to 300 μm.

The electro-conductive layer 20*b* has a through-hole in the thickness direction. Thanks to the presence of the through-hole, a below-described resinous layer reaches the substrate 20*a* by penetrating into the through-hole. The substrate 20*a*, the electro-conductive layer 20*b*, and the resinous layer 20*e* become integrated and strongly adhered to each other as a result, thereby suppressing delamination while improving durability.

The method for providing pores running through the electro-conductive layer 20*b* in the thickness direction is not particularly limited. For instance the method may involve forming a pattern on the electro-conductive layer 20*b* by photolithography, followed by hole formation by chemical etching, or by hole formation using a laser or a focused ion beam. Pore formation through the use of a silver nanoparticle material will be explained in particular in the present disclosure.

Figure 8:
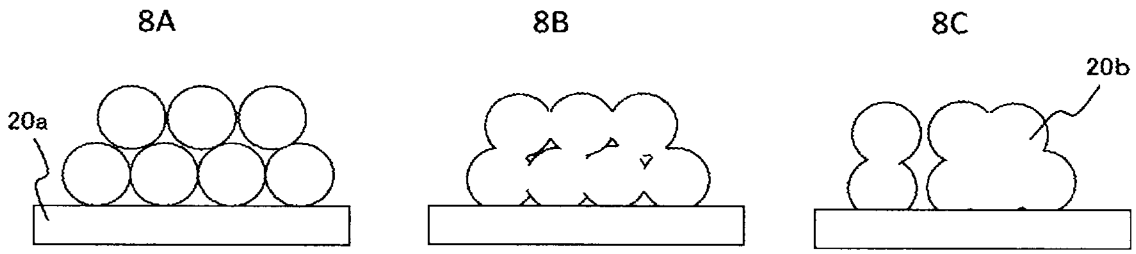
FIGS. 8A to 8C are a set of schematic diagrams of the mechanism of formation of pores that run through an electro-conductive layer of a fixing rotating member according to an embodiment, in the thickness direction.

A film of a coating material containing silver nanoparticles having a particle size of 10 to 50 nm is formed first. As a result, a state is brought about in which particles are layered up, as illustrated in FIG. 8A. The instability of the surface energy of the nanoparticles causes the particles to fuse together as a result, even when fired at a low temperature of about 100° C., to form a film with nano-sized pores as illustrated in FIG. 8B. The electro-conductive layer 20*b* is preferably a sintered body of silver nanoparticles.

The layered body on which the silver nanoparticles are formed is fired (sintered) at a high temperature of about 300° C. The firing temperature is preferably 280 to 450° C., or 300 to 400° C. Upon sintering, the nanoparticles coalesce further with each other, and also the pores coalesce with each other so as to minimize surface energy, growing until pores run through in the thickness direction, as illustrated in FIG. 8C.

The pores thus formed are deemed to be connected not only in the thickness direction but also in the circumferential direction and the axial direction, and have a three-dimensional mesh structure. It is deemed that penetration of the below-described resinous layer 20*e* into the pores results in a drastic increase of the contact area of the electro-conductive layer 20*b* and the resinous layer 20*e*, and in a more pronounced anchor effect, which in turn translates into significantly improved adhesion.

(4) Resinous Layer

The fixing rotating member comprises the resinous layer 20*e* on the surface of the electro-conductive layer 20*b*, the surface is opposed to a side of the electro-conductive layer facing the substrate 20*a*. The resinous layer 20*e* protects the electro-conductive layer 20*b*, and has the functions of preventing oxidation of the electro-conductive layer 20*b*, ensuring insulation, and enhancing strength.

The resin that constitutes at least a part of the resinous layer 20*e* is not particularly limited. Similarly to the resin for the substrate 20*a*, the resin in the resinous layer 20*e* is preferably a resin whose physical properties change little when the electro-conductive layer 20*b* is heated, and such that the resin can maintain high strength. Accordingly, the resinous layer 20*e* preferably comprises a heat-resistant resin as a main component, and is preferably made up of a heat-resistant resin. The heat-resistant resin is for instance a resin that does not melt or decompose at a temperature below 200° C. (preferably below 250° C.).

The resin that constitutes at least a part of the resinous layer 20*e* preferably comprises at least one selected from the group consisting of a polyimide (PI), a polyamide-imide (PAI), a modified polyimide and a modified polyamide-imide. More preferably, the resin that constitutes at least a part of the resinous layer 20*e* is at least one selected from the group consisting of a polyimide and a polyamide-imide. Modification is identical to that explained concerning the substrate 20*a*.

These imide-based materials can be applied in a liquid form referred to as varnish; when applied onto the electro-conductive layer 20*b*, the materials penetrate accordingly into the pores that are formed in the electro-conductive layer 20*b*, such that the materials can thereafter be made into a film, in that state, by being fired. Through the use of an imide-based material similar to that of the substrate 20*a*, the imide-based material penetrates into the pores of the electro-conductive layer 20*b*, and adhesiveness can be further ensured, and the occurrence of delamination can be further suppressed, once the material reaches the substrate 20*a*.

It suffices herein that the resin that constitutes at least a part of the resinous layer 20*e* should penetrate into at least part of the through-hole. Preferably, the resin that constitutes at least a part of the resinous layer 20*e* having penetrated into the through-hole is in contact with the substrate 20*a*. The degree of penetration is not particularly limited, and it suffices that the resin penetrates deep enough so that delamination can be suppressed.

For instance, the resin preferably penetrates into 50 to 100%, or 80 to 100%, or 90 to 100% of the through-hole (more preferably, the resin comes in contact with the substrate 20*a*) in an observation under a scanning electron microscope.

The resinous layer 20*e* may contain a thermally conductive filler, from the viewpoint of heat transfer. By improving thus heat transfer it becomes possible to efficiently transfer heat generated in the electro-conductive layer 20*b* to the outer surface of the fixing rotating member.

The thickness of the resinous layer 20*e* is preferably 10 to 100 μm, more preferably 20 to 60 μm. The thickness of the resinous layer 20*e* and the thickness of the substrate 20*a* are adjusted as appropriate in accordance with the materials of the foregoing, from the viewpoint of easing the stress acting upon the electro-conductive layer 20*b* at the time of flexing of the fixing rotating member. For instance in a case specifically where the substrate and the resinous layer are made up of the same material, such as a polyimide, preferably the substrate and the resinous layer have substantially the same thickness. That is, the ratio of the absolute value of the difference in thickness between the substrate and the resinous layer relative to the thickness of the substrate is preferably 10% or lower, and particularly 5% or lower. In a case where the substrate consists of a polyimide and the resinous layer consists of a polyamide-imide, the thickness of the resinous layer lies preferably in the range for instance from 15% to 25%. The occurrence of cracks in the electro-conductive layer 20*b* when the fixing rotating member is bent can be more readily prevented by setting the thickness relationship between the substrate and the resinous layer to be as described above.

The materials of the substrate 20*a* and the resinous layer 20*e* of the fixing rotating member can be analyzed in accordance with the procedure below.

A sample of 10 mm square is cut out from the fixing rotating member, and any elastic layer or surface layer of the sample is removed using a razor or a solvent. The material can be checked by subjecting the obtained sample to a total reflection (ATR) measurement using an infrared spectrometer (FT-IR) (for instance product name: Frontier FT-IR, by PerkinElmer Inc.).

(5) Elastic Layer

The fixing rotating member may have an elastic layer 20*c* on the outer surface of the resinous layer 20*e*. The elastic layer 20*c* is a layer for imparting flexibility to the fixing rotating member, for the purpose of ensuring a fixing nip in the fixing apparatus. In a case where the fixing rotating member is used as a heating member that comes in contact with toner on paper, the elastic layer 20*c* also functions as a layer for imparting flexibility such that the surface of the heating member can hug paper unevenness.

The elastic layer 20*c* has for instance rubber as a matrix, and particles dispersed in the rubber. More specifically, the elastic layer 20*c* preferably contains rubber and a thermally conductive filler, and is preferably made up of a cured product resulting from curing a composition that contains at least a rubber starting material (base polymer, crosslinking agent or the like), and a thermally conductive filler.

From the viewpoint of bringing out the function of the elastic layer 20*c* described above, the elastic layer 20*c* is preferably made up of cured silicone rubber containing thermally conductive particles, and more preferably is made up of a cured product of an addition-curable silicone rubber composition.

The silicone rubber composition can contain for instance thermally conductive particles, a base polymer, a crosslinking agent and a catalyst, and as needed, also additives. Most silicone rubber compositions are liquid, and accordingly the thermally conductive filler disperses readily; the elasticity of the elastic layer 20*c* to be produced can be easily adjusted through adjustment of the degree of crosslinking in accordance with the type and addition amount of the thermally conductive filler.

The matrix has the function of bringing out elasticity in the elastic layer 20*c*. The matrix preferably contains silicone rubber, from the viewpoint of bringing out the above-described function of the elastic layer 20*c*. Silicone rubber is preferable herein by virtue of exhibiting high heat resistance that allows maintaining flexibility even in an environment where a paper non-passage region reaches a high temperature of about 240° C. For instance a cured product of a below-described addition-curable liquid silicone rubber composition can be used as the silicone rubber. The elastic layer 20*c* can be formed through application and heating of a liquid silicone rubber composition in accordance with a known method.

A liquid silicone rubber composition ordinarily contains the following components (a) to (d):

Component (a): organopolysiloxane having unsaturated aliphatic groups;

Component (b): organopolysiloxane having active hydrogen bonded to silicon;

Component (c): catalyst; and

Component (d): thermally conductive filler

The various components will be explained below.

Component (a)

The organopolysiloxane having unsaturated aliphatic groups is an organopolysiloxane having unsaturated aliphatic groups such as vinyl groups; examples thereof include those represented by Formula (1) and Formula (2) below.

(1)

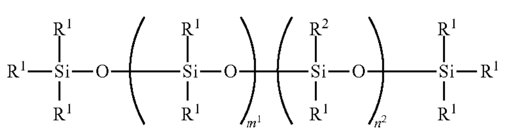

In Formula (1), $m^1$ represents an integer equal to or greater than 0, and $n^1$ represents an integer equal to or greater than 3. In Structural formula (1), $R^1$ each independently represent a monovalent unsubstituted or substituted hydrocarbon group containing no unsaturated aliphatic group, where at least one of $R^1$ represents a methyl group; and $R^2$ each independently represent an unsaturated aliphatic group.

(2)

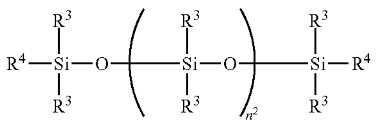

In Formula (2), $n^2$ represents a positive integer, $R^3$ each independently represent a monovalent unsubstituted or substituted hydrocarbon group containing no unsaturated aliphatic group, where at least one $R^3$ represents a methyl group, and $R^4$ each independently represent an unsaturated aliphatic group.

In Formulae (1) and (2), examples of the monovalent unsubstituted or substituted hydrocarbon group containing no unsaturated aliphatic group, and which can be represented by $R^1$ and $R^3$, include the following groups.

Unsubstituted Hydrocarbon Groups

Alkyl groups (for instance methyl groups, ethyl groups, propyl groups, butyl groups, pentyl groups and hexyl groups).

Aryl groups (for instance phenyl groups).

Substituted Hydrocarbon Groups

Substituted alkyl groups (for instance chloromethyl groups, 3-chloropropyl groups, 3,3,3-trifluoropropyl groups, 3-cyanopropyl groups and 3-methoxypropyl groups).

The organopolysiloxanes represented by Formulae (1) and (2) have at least one methyl group directly bonded to silicon atoms that form the chain structure. For reasons of ease of synthesis and handling, however, 50% or more of each of $R^1$ and $R^3$ are preferably methyl groups, and more preferably, all $R^1$ and $R^3$ are methyl groups.

Examples of unsaturated aliphatic groups that can be represented by $R^2$ and $R^4$ in Formulae (1) and (2) include the following groups. Examples of unsaturated aliphatic groups include vinyl groups, allyl groups, 3-butenyl groups, 4-pentenyl groups and 5-hexenyl groups. Among the foregoing, all $R^2$ and $R^4$ are preferably vinyl groups, since these allow for easy synthesis and handling, are inexpensive, and readily undergo crosslinking reactions.

Component (a) preferably has a viscosity from 1000 $mm^2/s$ to 50000 $mm^2/s$, from the viewpoint of moldability. When viscosity is lower than 1000 $mm^2/s$, it is difficult to adjust the hardness to the required hardness of the elastic layer 20*c*, whereas when the viscosity is higher than 50000 $mm^2/s$, the viscosity of the composition becomes excessively high, which makes coating difficult. Viscosity (kinetic viscosity) can be measured herein using for instance a capillary viscometer or a rotational viscometer, on the basis of JIS Z 8803:2011.

The compounding amount of component (a) is preferably 55 vol % or higher, from the viewpoint of durability, and 65 vol % or lower, from the viewpoint of heat transfer, referred to the liquid silicone rubber composition that is used for forming the elastic layer 20*c*.

Component (b)

The organopolysiloxane having active hydrogens bonded to silicon functions herein as a crosslinking agent that reacts with the unsaturated aliphatic groups of component (a), under catalytic action, to form a cured silicone rubber.

Any organopolysiloxane having Si—H bonds can be used as the component (b). In particular, in one molecule an organopolysiloxane with 3 or more as the average number of hydrogen atoms bonded to silicon is preferably used, from the viewpoint of reactivity with the unsaturated aliphatic groups of component (a).

Specific examples of component (b) include linear organopolysiloxanes represented by Formula (3) below and cyclic organopolysiloxanes represented by Formula (4) below.

(3)

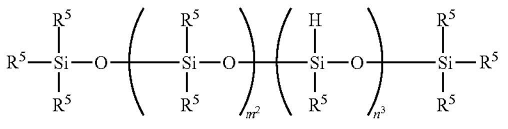

In Formula (3), $m^2$ represents an integer equal to or greater than 0, $n^3$ represents an integer equal to or greater than 3, and $R^5$ each independently represent a monovalent unsubstituted or substituted hydrocarbon group containing no unsaturated aliphatic group.

(4)

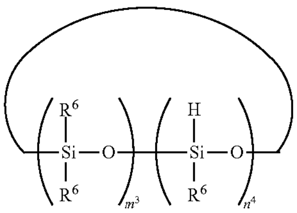

In Formula (4), $m^3$ represents an integer equal to or greater than 0, $n^4$ represents an integer equal to or greater than 3, and $R^6$ each independently represent a monovalent unsubstituted or substituted hydrocarbon group containing no unsaturated aliphatic group.

Examples of monovalent unsubstituted or substituted hydrocarbon groups containing no unsaturated aliphatic group and that can be represented by $R^5$ and $R^6$ in Formulae (3) and (4) include for instance groups similar to $R^1$ in Structural formula (1) above. For reasons of ease of synthesis and handling, however, among the foregoing preferably 50% or more of each of $R^5$ and $R^6$ is a methyl group, and more preferably, all $R^5$ and $R^6$ are methyl groups, since in that case excellent heat resistance can be easily obtained.

Component (c)

Catalysts used for forming silicone rubbers include for instance hydrosilylation catalysts for accelerating curing reactions. Known substances such as platinum compounds and rhodium compounds can be used as hydrosilylation catalysts. The compounding amount of the catalyst can be set as appropriate, and is not particularly limited.

Component (d)

Examples of the thermally conductive filler include metals, metal compounds and carbon fibers. Highly thermally conductive fillers are more preferable; concrete examples thereof include the materials below.

Metallic silicon (Si), silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), nickel (Ni), vapor-grown carbon fibers, PAN-based (polyacrylonitrile) carbon fibers and pitch-based carbon fibers.

These fillers can be used singly or in mixtures of two or more types.

The average particle size of the filler is preferably from 1 μm to 50 μm, from the viewpoint of handling and dispersibility. The shape adopted in the filler may be a spherical, pulverized, needle-like, plate-like or whisker-like shape. In particular, the filler is preferably spherical from the viewpoint of dispersibility. At least one from among a reinforcing filler, a heat-resistant filler and a coloring filler may be further added.

(6) Adhesive Layer

The fixing rotating member may have, on the outer surface of the elastic layer 20*c*, the adhesive layer 20*f* for bonding the below-described surface layer 20*d*. The adhesive layer 20*f* is a layer for bonding the elastic layer 20*c* and the surface layer 20*d*. The adhesive used in the adhesive layer 20*f* can be selected and used as appropriate, from among known adhesives, and is not particularly limited. From the viewpoint of ease of handling, however, there is preferably used an addition-curable silicone rubber having a self-adhesive component formulated thereinto.

The adhesive can contain for instance a self-adhesive component, an organopolysiloxane having a plurality of unsaturated aliphatic groups typified by vinyl groups, in the molecular chain, a hydrogen organopolysiloxane, and a platinum compound as a crosslinking catalyst. The adhesive layer 20*f* that bonds the surface layer 20*d* to the elastic layer 20*c* can be formed through curing of the adhesive that is applied onto the surface of the elastic layer 20*c*, as a result of an addition reaction.

Examples of the above self-adhesive component include the following.

- Silanes having at least one type, and preferably two or more types, selected from the group consisting of alkenyl groups such as vinyl groups, (meth)acryloxy groups, hydrosilyl groups (SiH groups), epoxy groups, alkoxysilyl groups, carbonyl groups and phenyl groups.
- Organosilicon compounds such as cyclic or linear siloxanes having from 2 to 30 silicon atoms, and preferably from 4 to 20 silicon atoms.
- Non-silicon-based organic compounds (i.e. containing no silicon atoms in the molecule) optionally containing an oxygen atom in the molecule. The organic compound contains in one molecule from 1 to 4, and preferably 1 or 2, aromatic rings such as a phenylene structure, having a valence of 1 to 4, and preferably of 2 to 4.

The organic compound also contains, in one molecule, at least one functional group (for instance an alkenyl group or a (meth)acryloxy group), preferably from 2 to 4 such functional groups, capable of contributing to a hydrosilylation addition reaction.

The above self-adhesive component may be used singly or in combinations of two or more types. From the viewpoint of adjusting viscosity and ensuring heat resistance, a filler component can be added to the adhesive, within a range conforming with the purport of the present disclosure. Examples of the filler component include the following.

- Silica, alumina, iron oxide, cerium oxide, cerium hydroxide, carbon black and the like.

The compounding amounts of the various components contained in the adhesive are not particularly limited, and can be set as appropriate. Such addition-curable silicone rubber adhesives are commercially available, and can be sourced easily. The thickness of the adhesive layer 20*f* is preferably 20 μm or less. By prescribing the thickness of the adhesive layer 20*f* to be 20 μm or less, heat resistance can be easily set to be small, and heat from the inner surface side can be readily transferred to a recording medium, with good efficiency, when the fixing belt according to the present embodiment is used as a heating belt in a thermal fixing apparatus.

(7) Surface Layer

The fixing rotating member may have the surface layer 20*d*. The surface layer 20*d* preferably contains a fluororesin for the purpose of bringing out a function as a release layer that prevents toner from adhering to the outer surface of the fixing rotating member. The surface layer 20*d* may be formed for instance through formation of a tube out of a resin exemplified below, or by molding the surface layer 20*d* through application of a resin dispersion.

- A tetrafluoroethylene-perfluoro(alkyl vinyl ether) copolymer (PFA), polytetrafluoroethylene (PTFE), a tetrafluoroethylene-hexafluoropropylene copolymer (FEP) and the like.

Among these exemplified resin materials PFA is particularly preferably used, from the viewpoint of moldability and toner releasability.

The thickness of the surface layer 20*d* is preferably from 10 μm to 50 μm. An appropriate surface hardness of the fixing rotating member is readily maintained by prescribing the thickness of the surface layer 20*d* to lie within this range.

As described above, one aspect of the present disclosure provides a fixing apparatus in which there is disposed a fixing rotating member. Therefore, a fixing apparatus can be provided in which a fixing rotating member is disposed that boasts high conductivity and excellent durability.

At least one aspect of the present disclosure allows achieving a fixing rotating member excellent in durability, and that comprises an electro-conductive layer comprising silver, such that the electro-conductive layer exhibits high adhesiveness to a substrate. At least one aspect of the present disclosure allows also achieving a fixing apparatus that contributes to stably providing high-quality electrophotographic images. At least one aspect of the present disclosure further allows achieving an electrophotographic image forming apparatus capable of forming stably high-quality electrophotographic images.

EXAMPLES

The present disclosure will be explained in more detail below on the basis of examples, but the disclosure is not meant to be limited to these examples.

Example 1

The surface of a cylindrical stainless steel mold having an outer diameter of 30 mm was subjected to a release treatment, and a commercially available polyimide precursor solution (U varnish S, by Ube Corporation) was applied on the surface, in accordance with a dipping method, to form a coating film. The coating film was then dried at 140° C. for 30 minutes, to volatilize the solvent in the coating film, followed by firing at 200° C. for 30 minutes and at 400° C. for 30 minutes to elicit imidization, and form a polyimide coating film having a thickness of 40 μm and a length of 300 mm.

On this polyimide film there was then formed a pattern of rings having a width of 300 μm at a pitch of 200 by inkjet using silver nanoparticle-containing ink (DNS163, by Daicel Corporation). Thereafter, firing was performed at 300° C. for 30 minutes to form an electro-conductive layer 20*b* having a maximum thickness of 2 μm.

Next, a PAI solution (Vylomax HR-16 NN, by Toyobo Co., Ltd.) was applied onto the entire surface of the electro-conductive layer 20*b* by ring coating, and the whole was then fired at 200° C. for 30 minutes, to form the resinous layer 20*e* having a thickness of 40 μm.

A primer (product name: DY39-051A/B, by Dow Toray Industries, Inc.) was then applied substantially uniformly to the outer peripheral surface of the resinous layer 20*e* in such a manner that the dry weight was 20 mg, and after solvent drying, a baking-printing treatment was performed for 30 minutes in an electric furnace set to 160° C.

On the primer there was then formed, by ring coating, a silicone rubber composition layer having a thickness of 250 μm; this layer was primary-crosslinked at 160° C. for 1 minute, and thereafter secondary-crosslinked at 200° C. for 30 minutes, to form the elastic layer 20*c*.

The following silicone rubber compositions were used.

As component (a), i.e. organopolysiloxane having alkenyl groups, there was prepared a vinylated polydimethylsiloxane having at least two vinyl groups in one molecule (product name: DMS-V41, by Gelest Inc., number-average molecular weight 68000 (polystyrene basis); molar equivalent of vinyl groups: 0.04 mmol/g).

As component (b), i.e. organopolysiloxane having Si—H groups there was prepared a polymethylhydrosiloxane having at least two Si—H groups in one molecule (product name: HMS-301, by Gelest Inc., number-average molecular weight 1300 (polystyrene basis), molar equivalent of Si—H groups: 3.60 mmol/g). Then 0.5 parts by mass of component (b) were added to 100 parts by mass of component (a), with thorough mixing, to yield an addition-curable silicone rubber stock solution.

As the catalyst component (c) there were added very small amounts of a catalyst for addition curing reactions (platinum catalyst: platinum carbonylcyclovinylmethylsiloxane complex) and of an inhibitor, with thorough mixing.

To this addition-curable silicone rubber stock solution there was added component (d), i.e. a thermally conductive filler, in the form of high-purity true-spherical alumina (product name: Alunabeads CB-A10S; by Showa Titanium Co.), with blending and kneading to a volume ratio of 45% referred to the elastic layer. An addition-curable silicone rubber composition having a JIS K 6253A-compliant durometer hardness of 10° after curing was thus obtained.

Subsequently, an addition-curable silicone rubber adhesive (product name: SE1819CV A/B, by Dow Toray Co., Ltd.) for forming the adhesive layer 20*f* was applied substantially uniformly onto the obtained elastic layer 20*c*, to a thickness of about 20 μm. A fluororesin tube (product name: NSE, by Gunze Ltd.) having an inner diameter of 29 mm and a thickness of 50 μm, for forming the surface layer 20*d*, was further laid up on the elastic layer 20*c*, while causing the diameter of the tube to expand.

Thereafter, excess adhesive was removed from between the elastic layer 20*c* and the fluororesin tube, through uniform wiping of the belt surface from above the fluororesin tube, so as to leave a small spacing of about 5 μm. The adhesive was then cured through heating at 200° C. for 30 minutes, to fix the fluororesin tube on the elastic layer 20*c*; lastly, both ends were cut off, so that the length was 240 mm, and yield a fixing rotating member.

Example 2

A fixing rotating member was produced in the same way as in Example 1, but herein the firing temperature of the electro-conductive layer 20*b* was set to 350° C.

Example 3

A fixing rotating member was produced in the same way as in Example 1, but herein the firing temperature of the electro-conductive layer 20*b* was set 400° C.

Example 4

A fixing rotating member was produced in the same way as in Example 1, but herein the material of the resinous layer 20*e* was a polyimide precursor solution (U varnish S, by UBE Corporation), with drying at 140° C. for 30 minutes, and firing at 200° C. for 30 minutes and at 400° C. for 30 minutes, to elicit imidization and layer formation.

Example 5

A fixing rotating member was produced in the same way as in Example 4, but herein the firing temperature of the electro-conductive layer 20*b* was set to 350° C.

Example 6

A fixing rotating member was produced in the same way as in Example 4, but herein the firing temperature of the electro-conductive layer 20*b* was set to 400° C.

Comparative Example 1

A fixing rotating member was produced in the same way as in Example 1, but herein the firing temperature of the electro-conductive layer 20*b* was set to 150° C.

Comparative Example 2

A fixing rotating member was produced in the same way as in Example 4, but herein the firing temperature of the electro-conductive layer 20*b* was set to 150° C.

Evaluation: Cross-Sectional Observation

A cross section of the electro-conductive layer 20*b* of each of Examples 1 to 6 and Comparative examples 1 and 2 was observed, to ascertain the presence or absence of pores running through in the thickness direction.

A sample having a length of 5 mm, a width of 5 mm and a thickness being the total thickness of the fixing rotating member was taken from arbitrary six sites of the fixing rotating member. Each of the obtained six samples was polished with an ion milling device (product name: IM4000, by Hitachi High-Technologies Corporation) so that a cross section in the total thickness of the electro-conductive layer. Here, polishing of the cross section by ion milling allows herein preventing particles from sloughing off the sample, and preventing abrasive contamination, while making it possible to form a cross section exhibiting few polishing marks.

Then, as to each of the samples, the cross section in the thickness direction of the electro-conductive layer 20*b*, the cross section being exposed in the polished cross section of each of the samples, was subsequently observed with Schottky Field Emission Scanning Electron Microscope (SEM) provided with energy dispersive X-ray spectrometer (EDS) (product name: FE-SEM JSM-F100, by JEOL Ltd.), to obtain cross-sectional images. As an observation condition, a backscattered electron image mode at 20000 magnifications was employed, and as condition for the backscattered electron image acquisition, an acceleration voltage was set at 3.0 kV and a working distance was set at 3 mm. From the obtained cross-sectional images, it was determined whether the electro-conductive layer 20*b* had a pore running through in the thickness direction, i.e. a through-hole. When, at least one through hole was identified in any of the cross-sectional images of the electro conductive layer, it was determined that the observed fixing rotating member was that according to the present disclosure.

through-hole. Here, one of the cross-sectional images of the fixing rotating member according to Example 4 was shown in FIG. 9. From FIG. 9, it was determined that the electro conductive layer of the rotation fixing member of Example 4 has a through-hole, and it was determined that the resin constituting at least a part of the resinous layer 20*e* had penetrated the through-hole.

Further, an elemental analysis was carried out on the cross section of the electro-conductive layer in a thickness direction of the electro-conductive layer, the cross section was exposed on the polished surface of the sample. The elemental analysis was carried out with EDS mounted on the JSM-F100 under the condition of acceleration voltage of 5~15 kV and magnification of 4000 times. In addition, the elemental analysis was carried out on arbitrary three sites in the cross section of the electro-conductive layer. Accordingly, the elemental analysis was carried out at total 18 sites, i.e. 3 sites×6 samples. Then the arithmetic mean value of the purity of silver obtained at 16 sites, i.e. 3 sites×6 samples, was taken as the purity of silver in the electro-conductive layer of the observed fixing rotating member.

Evaluation: Durability Test

For Examples 1 to 6 and Comparative examples 1 and 2, a repeated bending endurance test (MIT folding endurance tester, by Toyo Seiki Seisaku-sho, Ltd.) was performed, and delamination after the durability test was observed. The test temperature was 200° C., the bending angle was 135°, and the bending curvature was 6 mm, for 2,000,000 bends. The test result was evaluated in accordance with the following criteria.

Rank A: delamination of the resinous layer from the electro-conductive layer, did not occur;

Rank B: delamination of the resinous layer from the electro-conductive layer occurred before the number of bending reached to 2,000,000.

The results are given in Table 1. Here, in Table 1, as to Comparative Examples 1 and 2, the number of bending at which peeling of the resinous layer from the electro-conductive layer was observed for the first time.

TABLE 1

| | Electro-conductive layer | | Resinous layer | | Evaluation | | | |
|---|---|---|---|---|---|---|---|---|
| | Metal species | Firing temperature of electro-conductive layer ° C. | Resin type | Firing temperature of resinous layer ° C. | Purity of silver (mass %) | Presence of through-hole in electro-conductive layer | Whether resin penetrates through-hole or not | Evaluation Rank of Endurance delamination test (number of bending) |
| Example 1 | Ag | 300 | PAI | 200 | 99.9 | Yes | Yes | A |
| Example 2 | Ag | 350 | PAI | 200 | 99.9 | Yes | Yes | A |
| Example 3 | Ag | 400 | PAI | 200 | 99.9 | Yes | Yes | A |
| Example 4 | Ag | 300 | PI | 400 | 99.9 | Yes | Yes | A |
| Example 5 | Ag | 350 | PI | 400 | 99.9 | Yes | Yes | A |
| Example 6 | Ag | 400 | PI | 400 | 99.9 | Yes | Yes | A |
| Comparative Example 1 | Ag | 150 | PAI | 200 | 99.9 | No | No | B (700,000) |
| Comparative Example 2 | Ag | 150 | PI | 400 | 99.9 | No | No | B (100,000) |

Further, from the cross sectional images, it was checked whether the resin constituting at least a part of the resinous layer 20*e* had penetrated or not into at least part of the The item "Pores running through" is marked as "Yes" in a case where the electro-conductive layer had through-hole in the thickness direction. The item "Penetration of resin into pore" is marked as "Yes" in a case where the resin constituting at least a part of the resinous layer penetrated into at least part of the through-hole.

Figure 9:
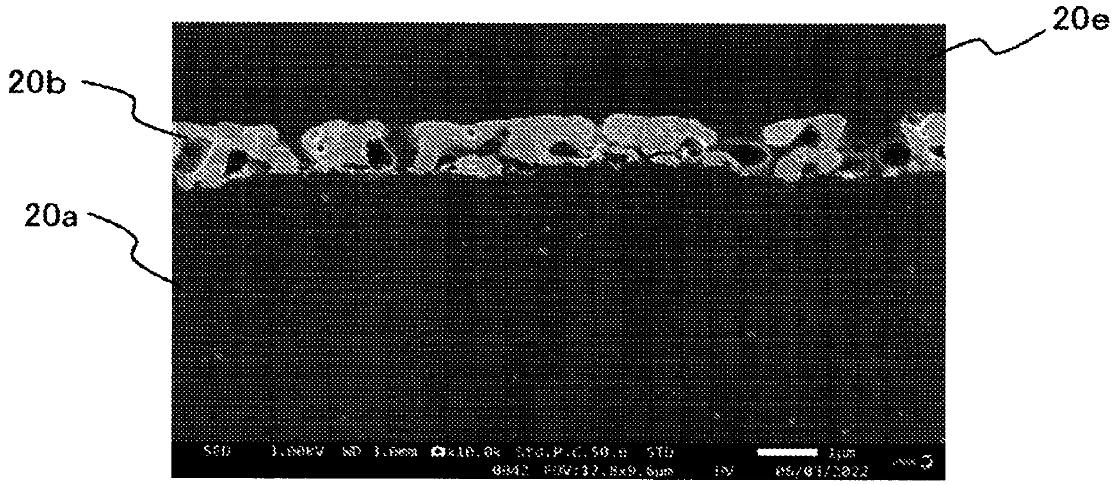
FIG. 9 is a cross-sectional image (photograph substituting for a drawing) of a substrate, an electro-conductive layer and a resinous layer of Example 4.

FIG. 9 reveals that that in Example 4 there were pores running through in the thickness direction of the electro-conductive layer 20*b*, and the resinous layer 20*e* penetrated into the pores, reaching the substrate 20*a* and coming into contact with the substrate. No interface or the like can be seen between the substrate 20*a* and the resinous layer 20*e*, and it is thus found that the foregoing are bonded to and integrated with each other. The resinous layer was similarly in contact with the substrate in the other examples as well.

In a comparison between the examples and the comparative examples, the results in Table 1 reveal that no delamination could be observed, and durability proved to be good, in those instances where the electro-conductive layer 20*b* had pores running through in the thickness direction and the resin of the resinous layer penetrated into the pores.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-171564, filed Oct. 26, 2022, and Japanese Patent Application No. 2023-175062, filed Oct. 10, 2023, which are hereby incorporated by reference herein in their entirety.

What is claimed is:

1. A fixing apparatus comprising a fixing rotating member, and an induction heating device causing the fixing rotating member to generate heat by induction heating, wherein the fixing rotating member comprises a substrate comprising a resin, an electro-conductive layer on the substrate, and a resinous layer on a surface of the electro-conductive layer, the surface being opposed to a side of the electro-conductive layer facing the substrate, wherein the electro-conductive layer extends in a circumferential direction of an outer peripheral surface of the substrate, wherein the electro-conductive layer comprises silver, wherein the electro-conductive layer has, in a thickness direction thereof, a through-hole, wherein at least a part of the through-hole is penetrated by a resin that constitutes at least a part of the resinous layer, wherein the induction heating device has:

an excitation coil for forming an alternating magnetic field causing the electro-conductive layer to generate heat by electromagnetic induction, the excitation coil being disposed in an interior of the fixing rotating member, and having a spiral shape portion, a spiral axis of which is substantially parallel to a direction of a rotation axis of the fixing rotating member; and a magnetic core, which is disposed within the spiral shape portion and which does not form a loop outward of the fixing rotating member to extend in the rotation axis direction, for guiding magnetic force lines of the alternating magnetic field, wherein a material of the magnetic core is a ferromagnetic body, wherein the electro-conductive layer generates heat mainly by an induced current induced by magnetic force lines exiting from one longitudinal end of the magnetic core, passing by an outer side of the electro-conductive layer, and returning to another longitudinal end of the magnetic core, and wherein the electro-conductive layer has a ring shape in a circumferential direction of the fixing rotating member and is formed in plurality while electrically divided from each other in a rotation axis direction.

2. The fixing apparatus according to claim 1, wherein the resin that constitutes at least the part of the resinous layer comprises at least one selected from the group consisting of a polyimide and a polyamide-imide.

3. The fixing apparatus according to claim 1, wherein the resin comprised in the substrate comprises at least one selected from the group consisting of a polyimide and a polyamide-imide.

4. The fixing apparatus according to claim 1, wherein a maximum thickness of the electro-conductive layer is 4 μm or less.

5. The fixing apparatus according to claim 1, wherein the resin constituting the resinous layer and penetrating the through-hole is in contact with the substrate.

6. The fixing apparatus according to claim 1, wherein the electro-conductive layer is a sintered body of a silver nanoparticle.

7. An electrophotographic image forming apparatus comprising:

an image bearing member bearing a toner image;

a transfer device transferring the toner image to a recording material; and a fixing apparatus fixing the transferred toner image to the recording material, wherein the fixing apparatus comprises a fixing rotating member, and an induction heating device causing the fixing rotating member to generate heat by induction heating, wherein the fixing rotating member comprises a substrate comprising a resin, an electro-conductive layer on the substrate, and a resinous layer on a surface of the electro-conductive layer, the surface being opposed to a side of the electro-conductive layer facing the substrate, wherein the electro-conductive layer extends in a circumferential direction of an outer peripheral surface of the substrate, wherein the electro-conductive layer comprises silver, wherein the electro-conductive layer has, in a thickness direction thereof, a through-hole, wherein at least a part of the through-hole is penetrated by a resin that constitutes at least a part of the resinous layer, wherein the induction heating device has:

an excitation coil for forming an alternating magnetic field causing the electro-conductive layer to generate heat by electromagnetic induction, the excitation coil being disposed in an interior of the fixing rotating member, and having a spiral shape portion, a spiral axis of which is substantially parallel to a direction of a rotation axis of the fixing rotating member; and a magnetic core, which is disposed within the spiral shape portion and which does not form a loop outward of the fixing rotating member to extend in the rotation axis direction, for guiding magnetic force lines of the alternating magnetic field, wherein a material of the magnetic core is a ferromagnetic body, wherein the electro-conductive layer generates heat mainly by an induced current induced by magnetic force lines exiting from one longitudinal end of the magnetic core, passing by an outer side of the electro-conductive layer, and returning to another longitudinal end of the magnetic core, and wherein the electro-conductive layer has a ring shape in a circumferential direction of the fixing rotating member and is formed in plurality while electrically divided from each other in a rotation axis direction.

* * * * *